(12) United States Patent
Juyal et al.

(10) Patent No.: US 10,831,878 B2
(45) Date of Patent: Nov. 10, 2020

(54) PREVENTING UNAUTHORIZED ACCESS TO SECURE INFORMATION SYSTEMS USING DYNAMIC, MULTI-DEVICE AUTHENTICATION

(71) Applicant: Bank of America Corporation, Charlotte, NC (US)

(72) Inventors: Rakesh Juyal, Bellevue, WA (US); Michael Toth, Charlotte, NC (US); Muniraju Jayaramaiah, Bellevue, WA (US); Ashish Arora, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 202 days.

(21) Appl. No.: 15/881,033

(22) Filed: Jan. 26, 2018

(65) Prior Publication Data
US 2019/0236265 A1 Aug. 1, 2019

(51) Int. Cl.
*G06F 21/44* (2013.01)
*G06F 21/30* (2013.01)
(Continued)

(52) U.S. Cl.
CPC .......... *G06F 21/445* (2013.01); *G06F 21/305* (2013.01); *G06F 21/36* (2013.01);
(Continued)

(58) Field of Classification Search
CPC . H04L 43/045; H04L 43/04; H04L 2463/082; H04L 41/0631; H04L 63/0876;
(Continued)

(56) References Cited

U.S. PATENT DOCUMENTS 7,373,515 B2  5/2008  Owen et al.
7,516,483 B2  4/2009  Brennan
(Continued)

OTHER PUBLICATIONS

R. Barbera • A. Falzone • V. Ardizzone • D. Scardaci; The GENIUS Grid Portal: Its Architecture, Improvements of Features, and New Implementations about Authentication and Authorization; 16th IEEE International Workshops on Enabling Technologies: Infrastructure for Collaborative Enterprises (Year: 2007).*
(Continued)

*Primary Examiner* — Luu T Pham
*Assistant Examiner* — Chao Wang
(74) *Attorney, Agent, or Firm* — Banner & Witcoff, Ltd.; Michael A. Springs

(57) ABSTRACT

Systems for dynamically authenticating users are provided. A system may receive a request to access functionality. In response to the received request, an authentication grid may be dynamically generated. The authentication grid may include a plurality of fields, each identifiable by a field identifier, and including one or more characters that may be used to authenticate a user. The authentication grid may be transmitted to a computing device of a user. A character for authentication may be identified by the system. In some arrangements, the system may generate a request for user input including a character appearing in the authentication grid. The user may identify the field and input the character appearing in the field. The system may receive the requested character and may compare it to the identified character for authentication. If the received character and the identified character match, functionality may be enabled. If a match does not exist, functionality may be disabled.

21 Claims, 12 Drawing Sheets

(51) Int. Cl.
*G06F 21/42* (2013.01)
*G06F 21/36* (2013.01)
*H04L 29/06* (2006.01)

(52) U.S. Cl.
CPC .......... *G06F 21/42* (2013.01); *H04L 63/0876* (2013.01); *H04L 2463/082* (2013.01)

(58) Field of Classification Search
CPC ............ G06Q 20/108; G06Q 20/3221; G06Q 20/3223; G06Q 20/3276; G06F 16/188; G06F 21/305; G06F 21/445
See application file for complete search history.

(56) References Cited

U.S. PATENT DOCUMENTS

| | | | | |
|---|---|---|---|---|
| 8,191,126 | B2* | 5/2012 | Raghavan | H04L 63/083 726/7 |
| 9,117,068 | B1* | 8/2015 | Zhang | G06F 21/36 |
| 2004/0010721 | A1* | 1/2004 | Kirovski | G06F 21/36 713/183 |
| 2004/0128508 | A1 | 7/2004 | Wheeler et al. | |
| 2006/0156385 | A1 | 7/2006 | Chiviendacz et al. | |
| 2007/0174633 | A1 | 7/2007 | Draper et al. | |
| 2011/0142234 | A1 | 6/2011 | Rogers | |
| 2011/0295740 | A1* | 12/2011 | Blackwell | G06Q 20/10 705/39 |
| 2012/0005735 | A1* | 1/2012 | Prasanna | H04L 9/321 726/7 |
| 2014/0115679 | A1* | 4/2014 | Barton | G09C 5/00 726/7 |
| 2015/0178723 | A1* | 6/2015 | Khan | G06Q 20/3821 726/6 |
| 2017/0329944 | A1* | 11/2017 | Satyavarapu | H04L 63/10 |
| 2018/0004930 | A1* | 1/2018 | Csinger | H04L 9/3234 |
| 2018/0191702 | A1* | 7/2018 | Padmanabhan | G06F 21/36 |

OTHER PUBLICATIONS

L. Ramakrishnan; Securing next-generation grids; IT Professional (vol. 6, Issue: 2, pp. 34-39) (Year: 2004).*

Phillip H. Griffin; Security for Ambient Assisted Living: Multi-factor Authentication in the Internet of Things; 2015 IEEE Globecom Workshops (GC Wkshps) (pp. 1-5) (Year: 2015).*

* cited by examiner

PREVENTING UNAUTHORIZED ACCESS TO SECURE INFORMATION SYSTEMS USING DYNAMIC, MULTI-DEVICE AUTHENTICATION

BACKGROUND

Aspects of the disclosure relate to electrical computers and systems. In particular, one or more aspects of the disclosure relate to using dynamic, multi-device authentication to prevent unauthorized access to secure information systems and functionality associated therewith.

Protecting privacy of information and ensure secure information remains secure is of the utmost interest to most people and businesses today. However, unauthorized users continue to develop new ways to obtain unauthorized access to information. Conventional authentication systems rely on static information, such as credentials, biometric data, and the like, to authenticate users. Such static information is more easily obtained or falsified by unauthorized actors. In addition, conventional systems often rely on a single device, single level of authentication, or the like, when authenticating a user. These conventional arrangements may not provide sufficient security for certain types of information. Accordingly, dynamic authentication using multiple devices may be advantageous in securing information and providing secure access to different types of functionality.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with preventing unauthorized access to secure information systems and functionality associated therewith.

In some examples, a system, computing platform, or the like, may receive a request to access functionality. In response to the received request, an authentication grid may be dynamically generated. The authentication grid may include a plurality of fields, each field identifiable by a column header and a row header, and each field including one or more characters that may be used to authenticate a user. The generated authentication grid may be transmitted to and displayed on a computing device of a user.

In some examples, a character for authentication may be identified, generated, or the like, by the system. The character for authentication may be included in a field of the authentication grid upon generating the authentication grid, or may be identified from the authentication grid after generation.

In some arrangements, the system, computing platform, or the like, may generate an instruction or request for user input that may be transmitted to a computing device of the user. The instruction or request may include a request for user input including a character appearing in the authentication grid. The instruction or request may include a column header and a row header, a field identifier, or the like, identifying a field including the character that is being requested. Accordingly, the user may identify the field and input the character appearing in the field.

In some examples, the system, computing platform, and the like, may receive the user input including the requested character and may compare it to the identified character for authentication. If the received character and the identified character match, functionality may be enabled and a user may be provided access to the enabled functionality. If a match does not exist, functionality may be disabled and/or a user may be preventing from accessing functionality.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using dynamic authentication to prevent unauthorized access to secure information systems and functionality associated therewith.

As mentioned above, protecting information and from unauthorized access is important to individuals and businesses. Conventional systems and arrangements for authentication often rely on static data such as credentials including a username and password, personal identification number, biometric data, and the like, that may be falsified by unauthorized users. Accordingly, use of dynamic authentication may provide increased security of information and functionality associated with various systems.

As discussed herein, a user may be provided with a dynamically generated authentication grid. In some examples, the authentication grid may be presented to a user upon opening an application executing on a mobile device, upon request of a user or other entity, upon logging into a system such as an online system, or the like. The authentication grid may include a plurality of fields. Each field may include a field identifier, or may be identifier by a column header and a row header, and may include data such as a character, string of characters, or the like, that may be used to authenticate a user.

Accordingly, if a user attempts to access different types of functionality (e.g., execute a transaction or event, make a withdrawal, or the like), the user may be prompted to input data from one or more fields of the authentication grid. Accordingly, the user may once again be authenticated to the system by providing a character from one or more fields that may be compared to an identified character that may be used for authentication. If a match exists, the user may be authenticated and the functionality may be enabled for the user. If a match does not exist, the functionality may be disabled and/or a request for additional authenticating information may be transmitted to the user.

These and various other arrangements will be discussed more fully below.

Figure 1A:
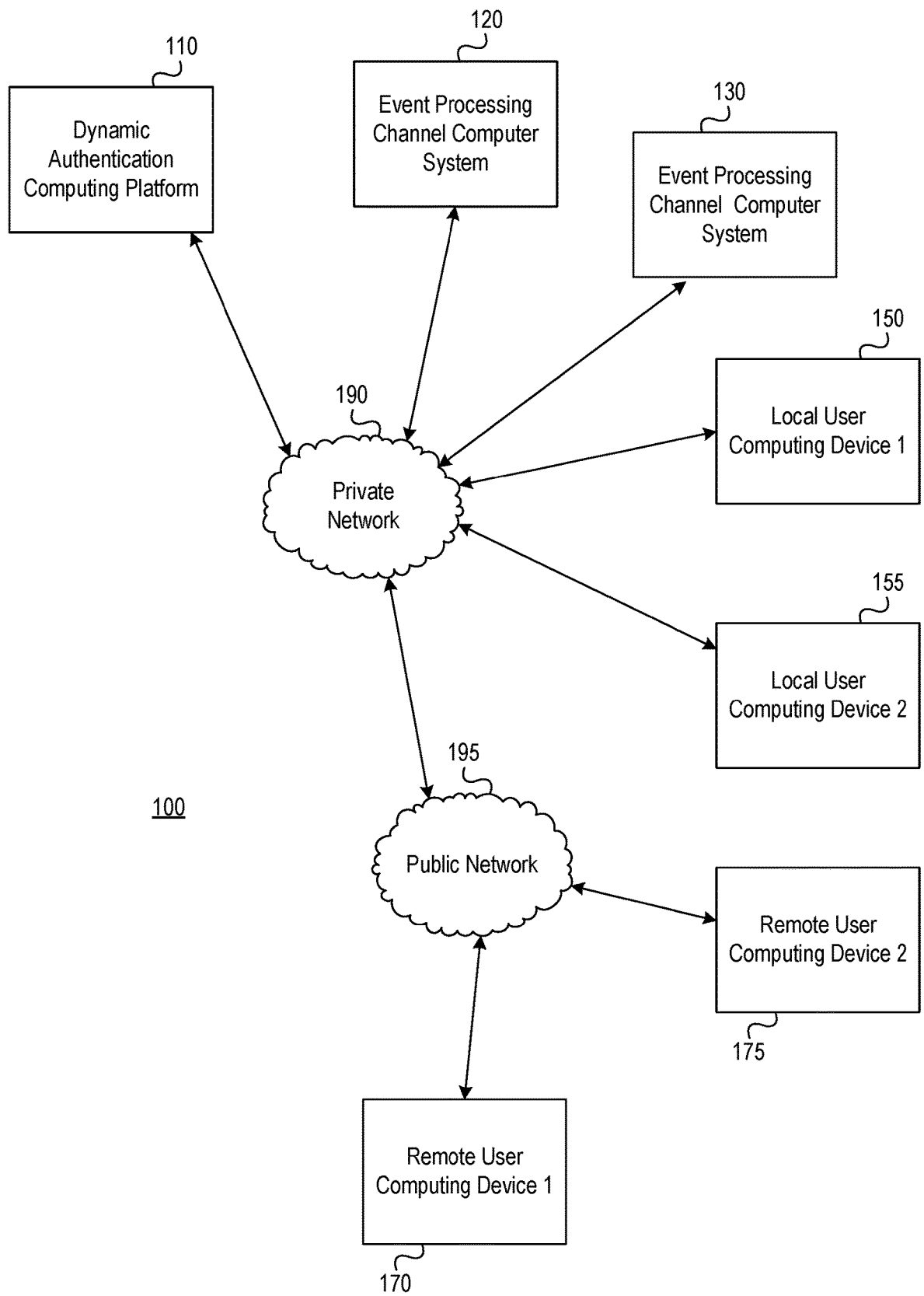
FIGS. 1A and 1B depict an illustrative computing environment for implementing dynamic authentication functions in accordance with one or more aspects described herein.
Figure 1B:
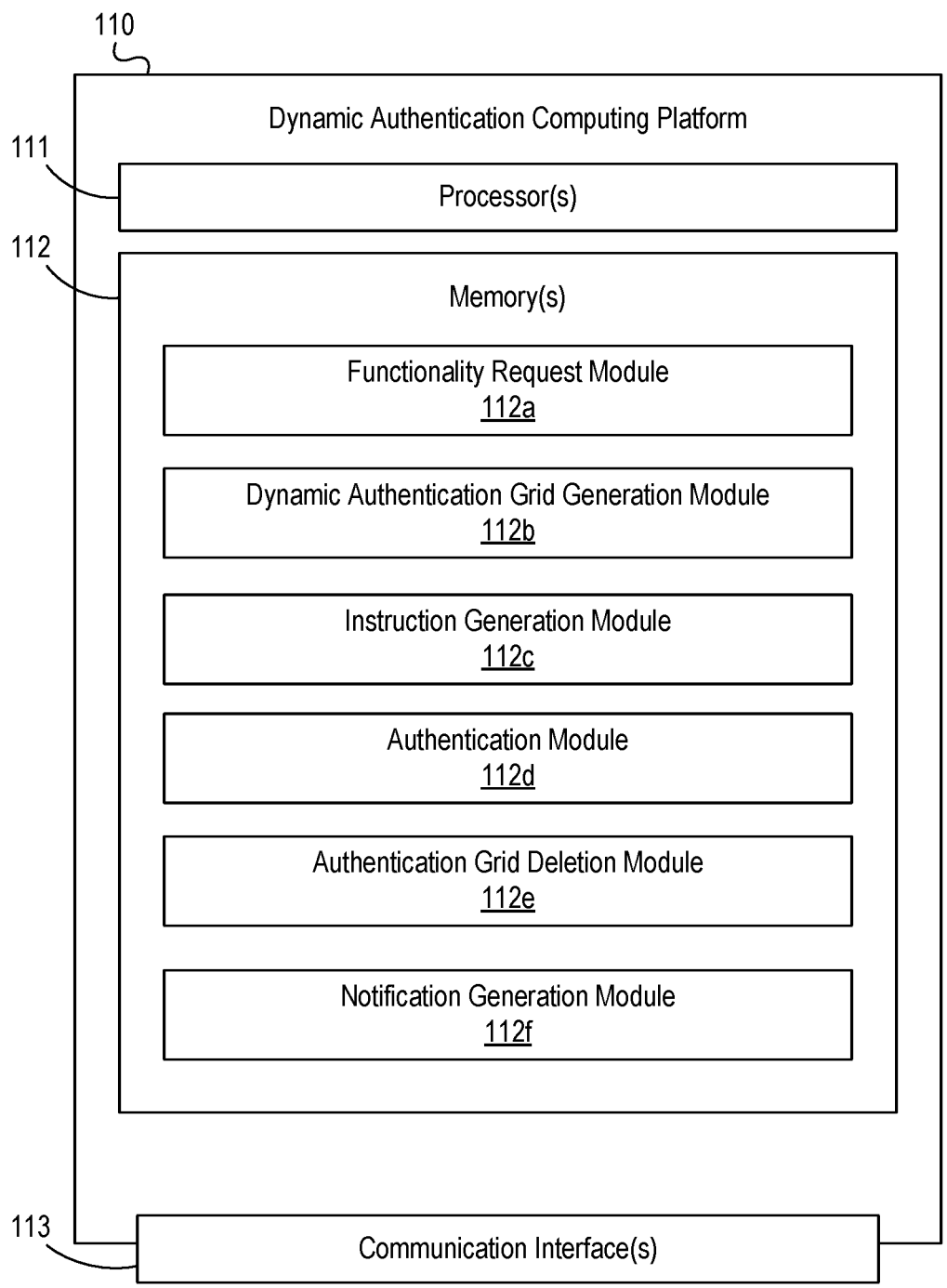

FIGS. 1A and 1B depict an illustrative computing environment for implementing and using a system for dynamic authentication in accordance with one or more aspects described herein. Referring to FIG. 1A, computing environment 100 may include one or more computing devices and/or other computing systems. For example, computing environment 100 may include a dynamic authentication computing platform 110, a first event processing channel computer system 120, a second event processing channel computer system 130, a first local user computing device 150, a second local user computing device 155, a first remote user computing device 170, and a second remote user computing device 175.

Dynamic authentication computing platform 110 may be configured to provide dynamic authentication functions. In some examples, a request to access functionality may be received. In some examples, the request may be received via a mobile device of a user (e.g., remote user computing device 170, 175). The request may be received via one or more channels, such as a mobile application executing on the mobile device, an online application, or via an associate computing device, such as via a customer service support center, automated assistance kiosk, or the like. In some examples, the one or more channels may be supported by one or more event processing channel computer systems 120, 130. The request may be transmitted to the dynamic authentication computing platform 110 and an authentication grid may be dynamically generated. The authentication grid may be transmitted to one or more devices, such as the mobile device of the user, a computing device associated with a customer service associate, or the like.

In some examples, the dynamic authentication computing platform 110 may generate a request for user input. The request may include a request for identification of a character displayed in the authentication grid (e.g., on the mobile device of the user, or the like). The request may include a row header identifier and a column header identifier associated with a particular field within the authentication grid. The request may be transmitted to another device, such as the mobile device of the user.

The user may then provide user input including a character displayed in the authentication grid in a field corresponding to the row header identifier and column header identifier in the request. The received user input, including the character, may be transmitted to the dynamic authentication computing platform 110 and may be compared to a pre-generated authentication character. If the characters match, the user may be authenticated and functionality may be enabled and accessible to the user. If the characters do not match, the functionality may be disabled, additional requests for authenticating information may be requested, or the like.

Event processing channel computer system 120 and event processing channel computer system 130 may be computer systems configured to provide functionality to a user via one or more channels. For instance, the event processing channel computer system 120, 130 may include computer systems associated with providing functionality associated with a mobile application executing on a mobile device of a user. In another example, the event processing channel computer system 120, 130 may include computer systems associated with providing functionality via an online application. In yet another example, the event processing channel computer system 120, 130 may include computer systems associated with providing functionality via a call center (e.g., a customer service associate computing device and associated devices, or the like), an automated teller machine (ATM), an automated service kiosk, a video assistance terminal, and the like. Although two event processing channel computer systems 120, 130 are shown in FIG. 1A, more or fewer event processing channel systems may be included without departing from the invention. Accordingly, in some examples, each channel (e.g., mobile, online, call center, or the like) may be associated with its own respective computer system. In other examples, more than one channel may be supported by a particular event processing channel computer system 120, 130.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control aspects associated with generating the authentication grid (e.g., frequency, number of uses before deletion, and the like), with deleting the authentication grid, and the like.

The remote user computing devices 170, 175 may be used to communicate with, for example, dynamic authentication computing platform 110, transmit requests for functionality access, display the generated authentication grid, receive user input associated with a character in a specified field of the authentication grid, display notifications, execute commands or instructions from the dynamic authentication computing platform 110, and the like.

In one or more arrangements event processing channel computer system 120, event processing channel computer system 130, local user computing device 150, local user computing device 155, remote user computing device 170, and/or remote user computing device 175 may be any type of computing device or combination of devices capable of performing the particular functions described herein. For example, event processing channel computer system 120, event processing channel computer system 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event processing channel computer system 120, event processing channel computer system 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic authentication computing platform 110. As illustrated in greater detail below, dynamic authentication computing platform 110 may include one or more computing devices configured to perform one or more of the functions described herein. For example, dynamic authentication computing platform 110 may include one or more computers (e.g., laptop computers, desktop computers, servers, server blades, or the like).

As mentioned above, computing environment 100 also may include one or more networks, which may interconnect one or more of dynamic authentication computing platform 110, event processing channel computer system 120, event processing channel computer system 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic authentication computing platform 110, event processing channel computer system 120, event processing channel computer system 130, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic authentication computing platform 110, event processing channel computer system 120, event processing channel computer system, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic authentication computing platform 110, event processing channel computer system 120, event processing channel computer system 130, local user computing device 150, local user computing device 155) with one or more networks and/or computing devices that are not associated with the organization. For example remote user computing device 170 and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., dynamic authentication platform 110, event processing channel computer system 120, event processing channel computer system 130, local user computing device 150, local user computing device 155).

Referring to FIG. 1B, dynamic authentication computing platform 110 may include one or more processors 111, memory 112, and communication interface 113. A data bus may interconnect processor(s) 111, memory 112, and communication interface 113. Communication interface 113 may be a network interface configured to support communication between dynamic authentication computing platform 110 and one or more networks (e.g., private network 190, public network 195, or the like). Memory 112 may include one or more program modules having instructions that when executed by processor(s) 111 cause dynamic authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic authentication computing platform 110 and/or by different computing devices that may form and/or otherwise make up dynamic authentication computing platform 110.

For example, memory 112 may have, store, and/or include a functionality request module 112a. Functionality request module 112a may store instructions and/or data that may cause or enable the dynamic authentication computing platform 110 to receive a request to access functionality. The request may be received from a mobile device of a user (e.g., one or more of remote user computing devices 170, 175), may be received from one or more of the event processing channel computer systems 120, 130, or the like. In some examples, the request for access to functionality may include a user opening a mobile application executing on a mobile device. In other examples, the request for access to functionality may include a user accessing a website associated with online functionality, a user initiating activity at an ATM or automated service kiosk, a call to a call center associate, and the like.

The dynamic authentication computer platform 110 may further have, store and/or include a dynamic authentication grid generation module 112b. The dynamic authentication grid generation module 112b may store instructions and/or data that may cause or enable the dynamic authentication computing platform 110 to generate an authentication grid. In some examples, the authentication grid may be generated automatically in response to the request for access to functionality (e.g., in response to a user opening a mobile application, in response to a user accessing a website providing online functionality, or the like). In other examples, the authentication grid may be generated on-demand. For instance, a user may request generation of an authentication grid. In another example, one or more predetermined types of events (e.g., withdrawals greater than a predetermined threshold, opening or closing account, or the like) may trigger generation of an authentication grid.

The dynamic authentication grid generation module 112b may further transmit the authentication grid to a computing device. For instance, the dynamic authentication grid generation module 112b may transmit the authentication grid to a mobile device of a user (e.g., remote user computing device 170, 175) and may cause the authentication grid to be displayed on the mobile device. In another example, the authentication grid may be transmitted to a user device and a service associate device to enable the service associate to confirm user input received from the user device.

The authentication grid may be any desired size. For instance, the authentication grid may be thirteen (13) columns by two rows, thereby creating twenty six (26) fields in which characters may be displayed. In another example, the authentication grid may be three (3) columns by three (3) rows, thereby creating a grid of nine (9) fields in which characters may be displayed. In still another example, the grid may be ten (10) rows by three (3) columns, thereby creating thirty (30) fields in which characters may be displayed.

In some examples, each column and row of the authentication grid may include a header. For instance, the columns may include headers such as "column 1, column 2, . . . " and the rows may include headers such as "row 1, row 2, . . . " In another example, the columns may each include a letter, e.g., "A, B, C, . . . " and the rows may each be labeled with a number, e.g., "1, 2, 3 . . . " In still other examples, each field (e.g., an intersection of a row and column) may include an identifier. For instance, each field may be labeled with a letter and each field may including a corresponding number, word, or other character, that may be used to authentication a user. Various other header labels may be used without departing from the invention.

As discussed, the intersection of each row and column may include a field having a character arranged therein. Each field may be identifiable by its respective row header and column header, by a single field identifier, or the like. The characters may include one or more numbers, letters, symbols, words, or the like. In some examples, the fields may be populated with characters in a randomly selected patterns. In some examples, the fields may be populated with characters of the same type (e.g., all letters, all numbers, or the like) or with characters of different types (e.g., some fields may include numbers while others include letters or combinations thereof).

In some arrangements, the authentication grid may be used one time and then deleted. For instance, upon receiving user input including data from a generated authentication grid, the dynamic authentication computing platform 110 may transmit a signal or command to delete the grid. If one or more additional events or functionality are requested, a second, different authentication grid may be dynamically generated.

In other examples, an authentication grid may be available for use during a user session. For instance, upon requesting access to functionality, a user session may be initiated (e.g., communication may be established between one or more devices to provide functionality). Upon ending the user session (e.g., by exiting the mobile application, online application, or the like), authentication grid may be deleted. However, during the user session, the authentication grid may be used more than one time to authenticate a user to authorize various functionality to be executed. In still other examples, the generated authentication grid may be deleted after expiration of a predetermined time period.

Dynamic authentication computing platform 110 may further have, store and/or include an instruction generation module 112c. Instruction generation module 112c may store instructions and/or data that may cause or enable the dynamic authentication computing platform 110 to generate instructions to be transmitted to a user for authenticating the user with the authentication grid. For instance, the instruction generation module 112c may identify a field including a character that may be used to authenticate the user. Accordingly, the instruction generation module 112c may generate an instruction requesting a user to provide user input including the character in the identified field. The instruction may identify the field using a row header and column header associated with the particular field, using the unique field identifier associated with the field, or the like. In some examples, the instruction may be transmitted to, for instance, a mobile device of the user (e.g., remote user computing device 170, 175) and may be displayed on the device. The instructions may be displayed via a mobile application executing on the device, via email, short message service (SMS), or the like.

Dynamic authentication computing platform 110 may further have, store and/or include an authentication module 112d. The authentication module 112d may store instructions and/or data that may cause or enable the dynamic authentication computing platform 110 to receive user input including a requested character or plurality of characters (e.g., data in the generated authentication grid from a field or plurality of fields identified by row header and column header, field identifier, or the like, in instructions transmitted to a user) and may compare the received character or plurality of characters to a pre-generated authentication character or plurality of characters. In some examples, the pre-generated authentication character or plurality of characters may be identified by the instruction generation module 112c and may be selected at random from the generated authentication grid. In some examples, the pre-generated character or plurality of characters may be generated separately from the authentication grid and may be inserted into the authentication grid (e.g., in one or more randomly selected fields) when the authentication grid is generated.

If the received character or plurality of characters matches the pre-generated character, the authentication module 112d may authenticate the user, enable functionality or the like. If the received character does not match the pre-generated character, the user might not be authenticated, functionality may be disabled, additional information may be requested, or the like.

The dynamic authentication computing platform 110 may further have, store and/or include an authentication grid deletion module 112e. The authentication grid deletion module 112e may store instructions and/or data that may cause or enable the dynamic authentication computing platform 110 to generate and transmit a signal, instruction or command to delete an authentication grid. For instance, upon occurrence of a triggering event (e.g., use of the authentication grid in one-time use scenarios, end of a user session, expiration of a predetermined time period, or the like), the authentication grid deletion module 112e may generate an instruction or command and may transmit the instruction or command to a device displaying the authentication grid. The instruction or command may include an instruction to delete the authentication grid. Upon being received by the device, the instruction or command may be automatically executed and the authentication grid may be deleted from the device.

Dynamic authentication computing platform 110 may further have, store and/or include a notification generation module 112*f*. The notification generation module 112*f* may store instructions and/or data that may cause or enable the dynamic authentication computing platform 110 to generate and transmit one or more notifications to a computing device (e.g., mobile device of a user, ATM, automated service kiosk, computing device of a call center associate, or the like). The notifications may include information related to whether the user was authenticated, functionality available to the user based on the authentication, additional information that may be requested to authenticate the user, and the like.

FIGS. 2A-2E depict an illustrative event sequence for implementing and using dynamic authentication functions in accordance with one or more aspects described herein. The events shown in the illustrative event sequence are merely one example sequence and additional events may be added, or events may be omitted, without departing from the invention.

Figure 2A:
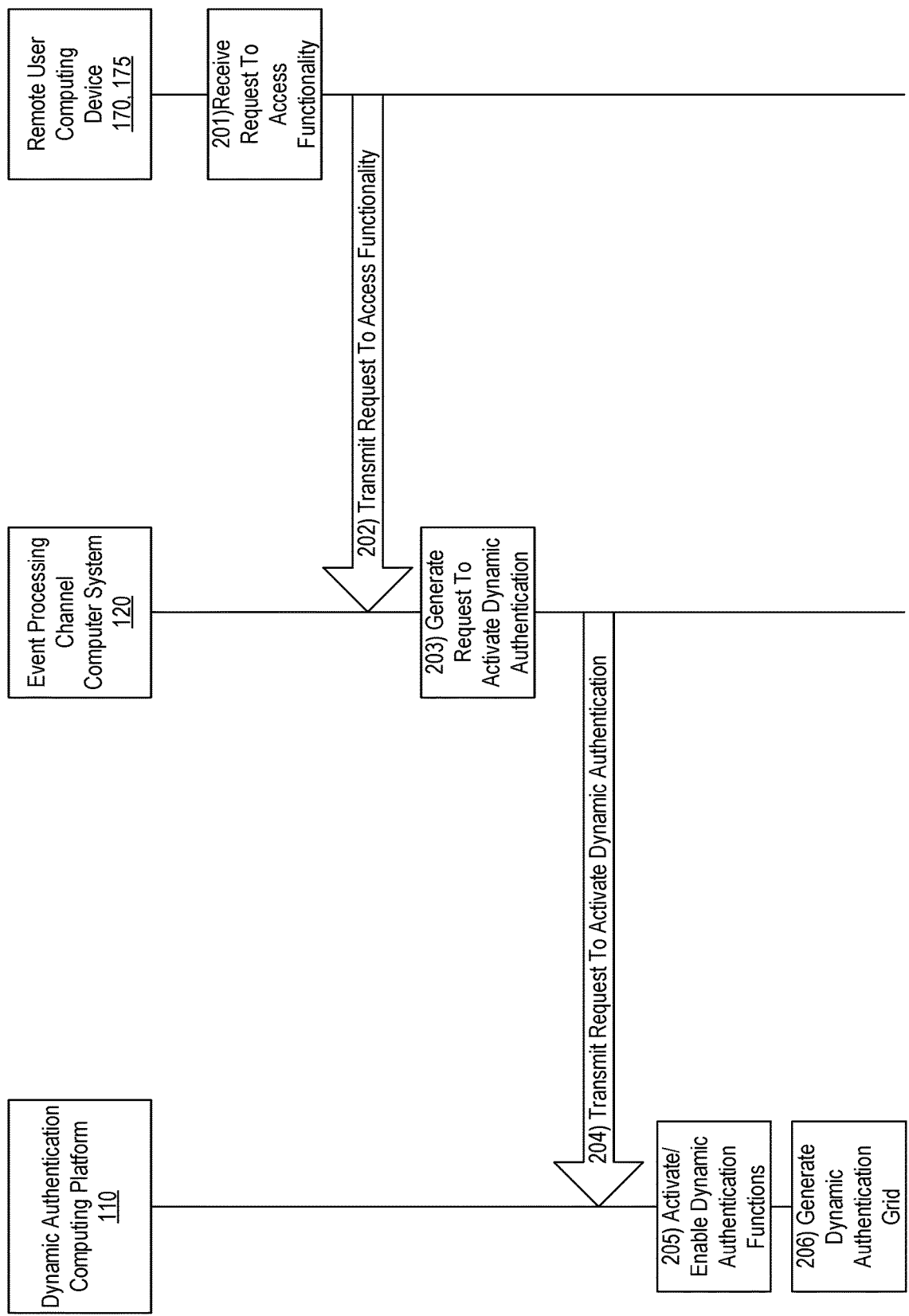
FIGS. 2A-2E depict an illustrative event sequence for implementing dynamic authentication functions in accordance with one or more aspects described herein.

Referring to FIG. 2A, at step 201, a request to access functionality may be received. For instance, the request to access functionality may be received by, for example, a remote user computing device 170, 175, such as a mobile device or other computing device of a user. In some examples, the request to access functionality may be received from the event processing channel computer system 120, 130, directly (e.g., in situations in which a user requests functionality via a call center or other service associate).

At step 202, the request to access functionality may be transmitted to, for instance, one or more event processing channel computer systems 120, 130. In some examples, the request to access functionality may include opening an application executing on a mobile device. Upon opening the application, a notification may be transmitted to one or more event processing channel systems associated with providing functionality via the mobile application.

At step 203, the event processing channel computer system 120, 130, may generate a request to activate dynamic authentication. For instance, a user may have a first level of authentication upon requesting access to functionality. For instance, a user may be logged into an application executing on the mobile device. However, additional authentication may be requested prior to providing any functionality, providing particular functionality, or the like. In those examples, the event processing channel computer system 120, 130 may generate a request to activate dynamic authentication. At step 204, the request to activate dynamic authentication may be transmitted to the dynamic authentication computing platform 110.

At step 205, the dynamic authentication computing platform 110 may receive the request to activate dynamic authentication functions and, in response, may activate or enable dynamic authentication functions. Upon activation of the dynamic authentication functions, an authentication grid may be dynamically generated in step 206.

Figure 2B:
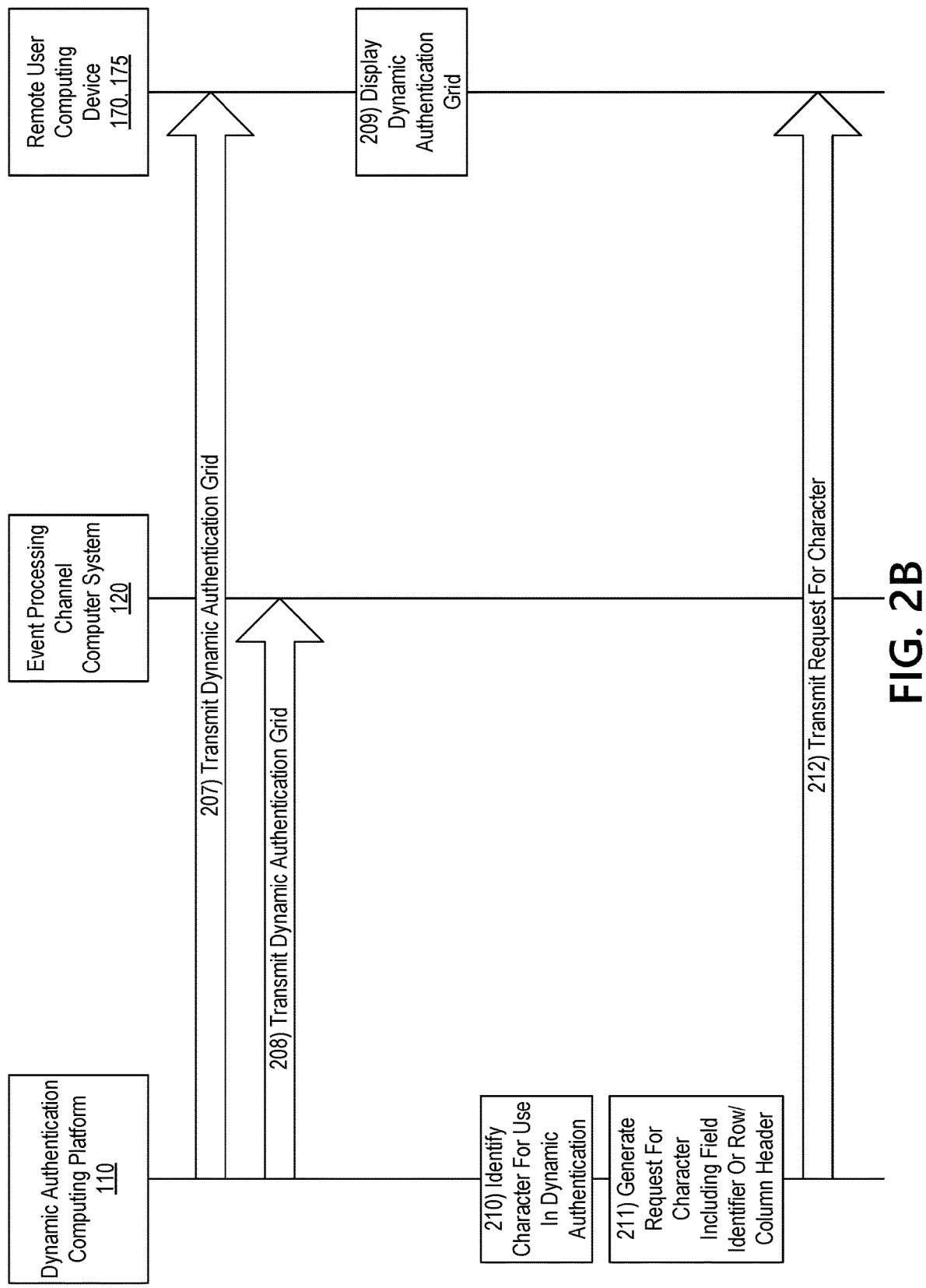

With reference to FIG. 2B, at step 207, the dynamically generated authentication grid may be transmitted to one or more computing devices, such as remote user computing device 170, 175 (e.g., a mobile device or other computing device of the user). In some examples, the dynamically generated authentication grid may also be transmitted to one or more computing devices within an event processing channel computer system 120, 130, as in step 208. For instance, if the request to access functionality was received via, for example, a call center, a service associate computing device used to assist the user via phone may receive the dynamically generated authentication grid, in addition to the user device receiving the authentication grid.

In step 209, the dynamic authentication grid may be displayed on the remote user computing device 170, 175. In some examples, the process of receiving the request to access functionality may be transmitted upon startup (e.g., upon a user opening an application, starting up a device, or the like). In some arrangements, steps associated with requesting authentication functionality, generating an authentication grid, and the like, may be performed upon startup so that upon startup, the authentication grid may be automatically generated, transmitted to the device, and displayed to the user. In other examples, the authentication grid may be automatically generated and transmitted but displayed upon a triggering event, such as a request to access particular functionality, or the like. In still other examples, the authentication grid may be generated and transmitted upon request.

In some examples, the authentication grid may be displayed to the user as part of (e.g., a portion of) a user interface of an online application, mobile application, or the like. In other examples, the authentication grid may be displayed via email, SMS, or the like.

In step 210, the dynamic authentication computing platform 110 may identify a character for use in dynamically authenticating a user. For instance, the dynamic authentication computing platform 110 may dynamically identify, from a plurality of characters, one or more characters for use in authenticating a user. In some examples, the step of identifying the character may be performed prior to the authentication grid being generated and the identified character may be randomly placed in a field in the authentication grid. Alternatively, the identified character may be identified from characters populating the fields of the generated authentication grid.

In step 211, a request for user input providing an authenticating character may be generated. For instance, the request may including instructions requesting user input including a character visible to the user in the authentication grid. The request may identify the requested character by a row header and a column header, field identifier, or the like, associated with the field in which the character appears. In some examples, the request may only include the row header and column header or field identifier associated with the field in which the character appears.

In step 212, the generated request for user input may be transmitted to the remote user computing device 170, 175 (e.g., the computing device of the user).

Figure 2C:
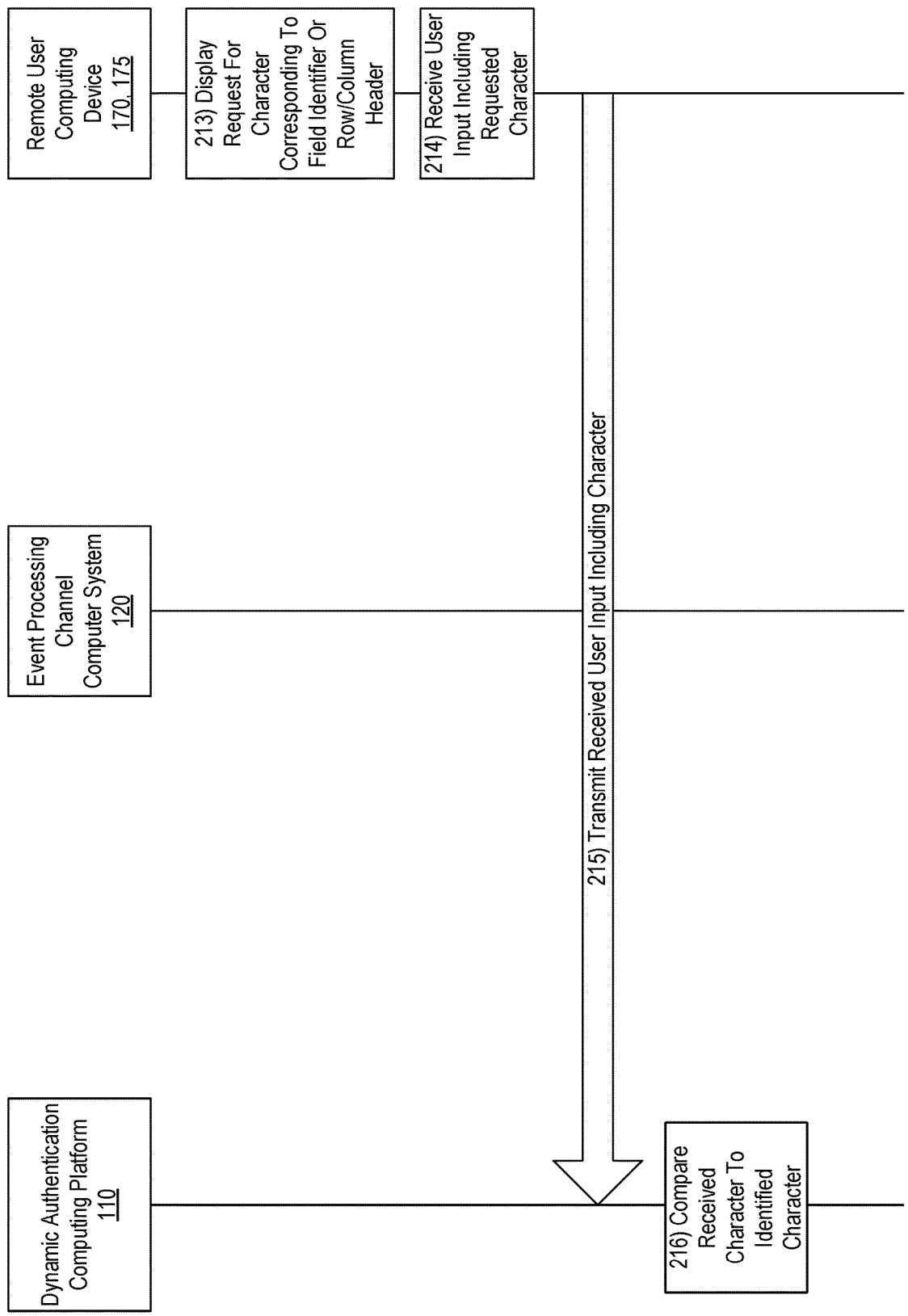

With reference to FIG. 2C, at step 213, the generated request may be displayed on the remote user computing device 170, 175. In step 214, user input including the requested character may be received. In step 215, the received user input including the requested character may be transmitted to the dynamic authentication computing platform 110.

At step 216, the received user input including the requested character may be compared to the identified character (e.g., in step 210).

Figure 2D:
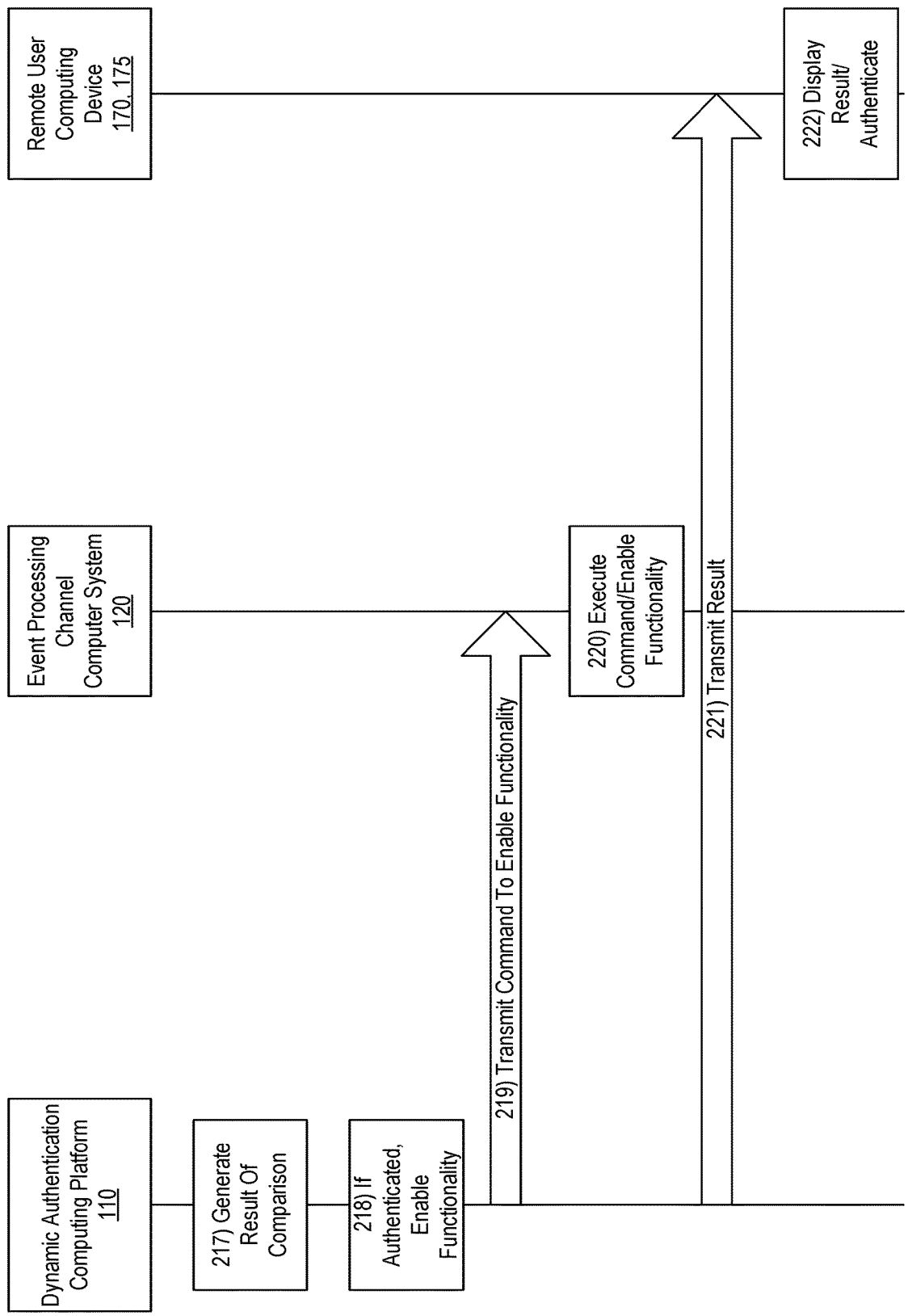

With reference to FIG. 2D, at step 217, a result of the comparison may be generated. For instance, the result may indicate that a match occurred between the received character and the identified character. Alternatively, the result may indicate that no match occurred. If the result indicates that a match occurred, the user may be authenticated (e.g., either at a first authentication layer or a second or subsequent authentication layer) and, in step 218, functionality may be enabled. In some examples, authenticating the user via the authentication grid may enable all functionality (e.g., all functionality may be disabled until the user is authenticated via the authentication grid, via another, additional authentication layer, or the like). In other examples, authenticating the user via the authenticating grid may enable certain functionality that is not accessible to the user (e.g., is disabled) unless the user is authenticated via the authentication grid. In some examples, certain types of events or functionality (e.g., high dollar value events, events that are prone to unauthorized activity, or the like) may require additional authentication via the authentication grid.

At step 219, a signal, instruction or command to enable functionality may be generated and transmitted to an event processing channel computer system 120, 130. At step 220, the signal, instruction or command may be received by the event processing channel computer system 120, 130 and may be executed by the event processing channel computer system 120, 130 to enable the functionality identified.

In step 221, a notification may be generated including the result of the comparison and transmitted to the remote user computing device 170, 175. In step 222, the notification including the result may be displayed on the remote user computing device 170, 175. In examples in which the result did not identify a match between the received character and the identified character, the notification may include an indication that functionality will remain disabled until the user is authenticated via the authentication grid, a request for additional authenticating information, or the like.

Figure 2E:
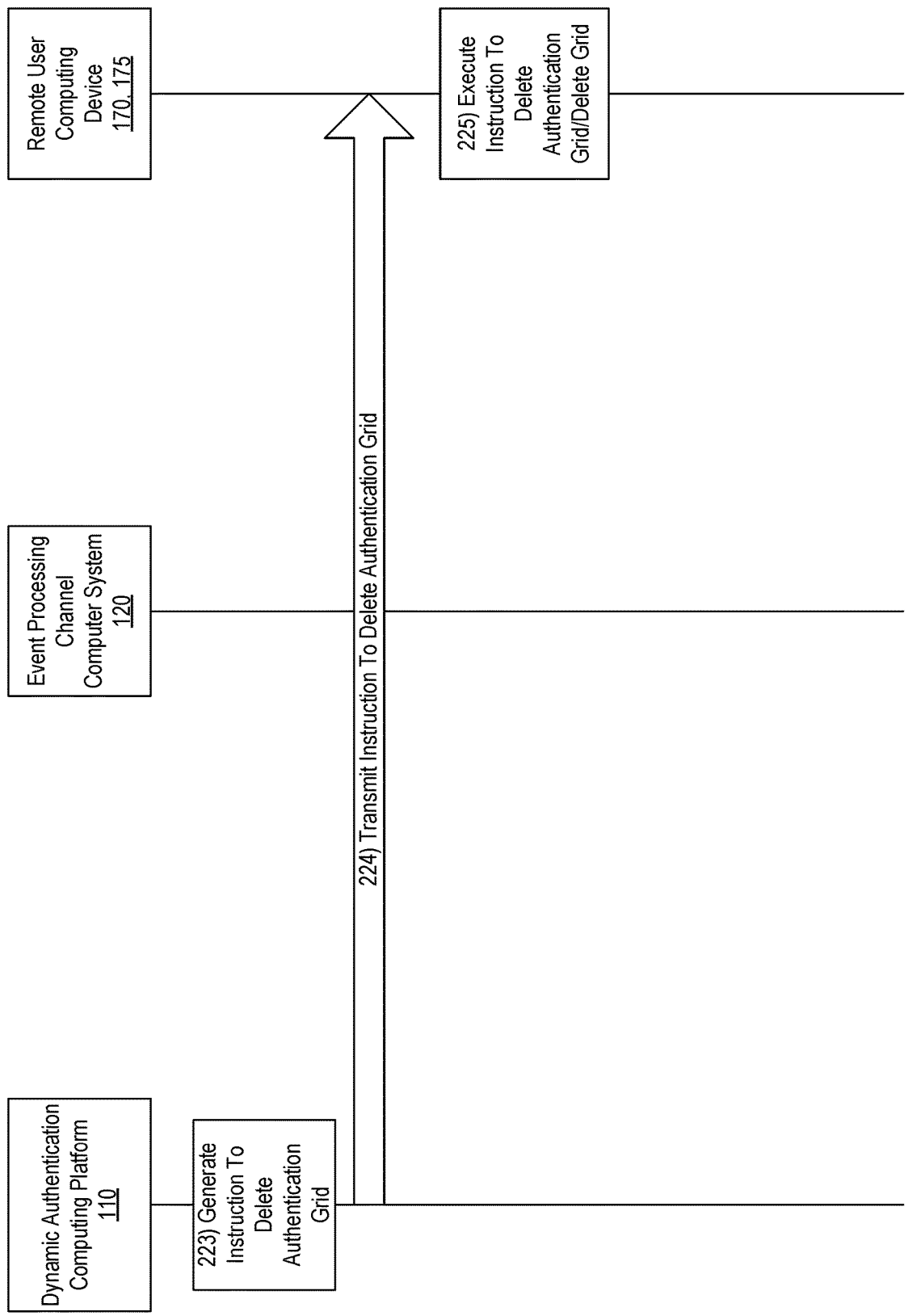

With reference to FIG. 2E, at step 223, an instruction, command or signal to delete the generated authentication grid may be generated. For instance, upon occurrence of a triggering event, such as, with a single-use authentication grid, after one use, at the end of a user session, or the like, an instruction to delete the authentication grid may be generated. At step 224, the generated instruction, command or signal may be transmitted to the remote user computing device 170, 175. At step 225, the instruction, command or signal may be received and executed by the remote user computing device 170, 175, and the authentication grid may be deleted. In some examples, after the authentication grid has been deleted, if access to additional functionality is requested (e.g., in a same user session, in a different user session, or the like) a second, different authentication grid may be generated.

Figure 3:
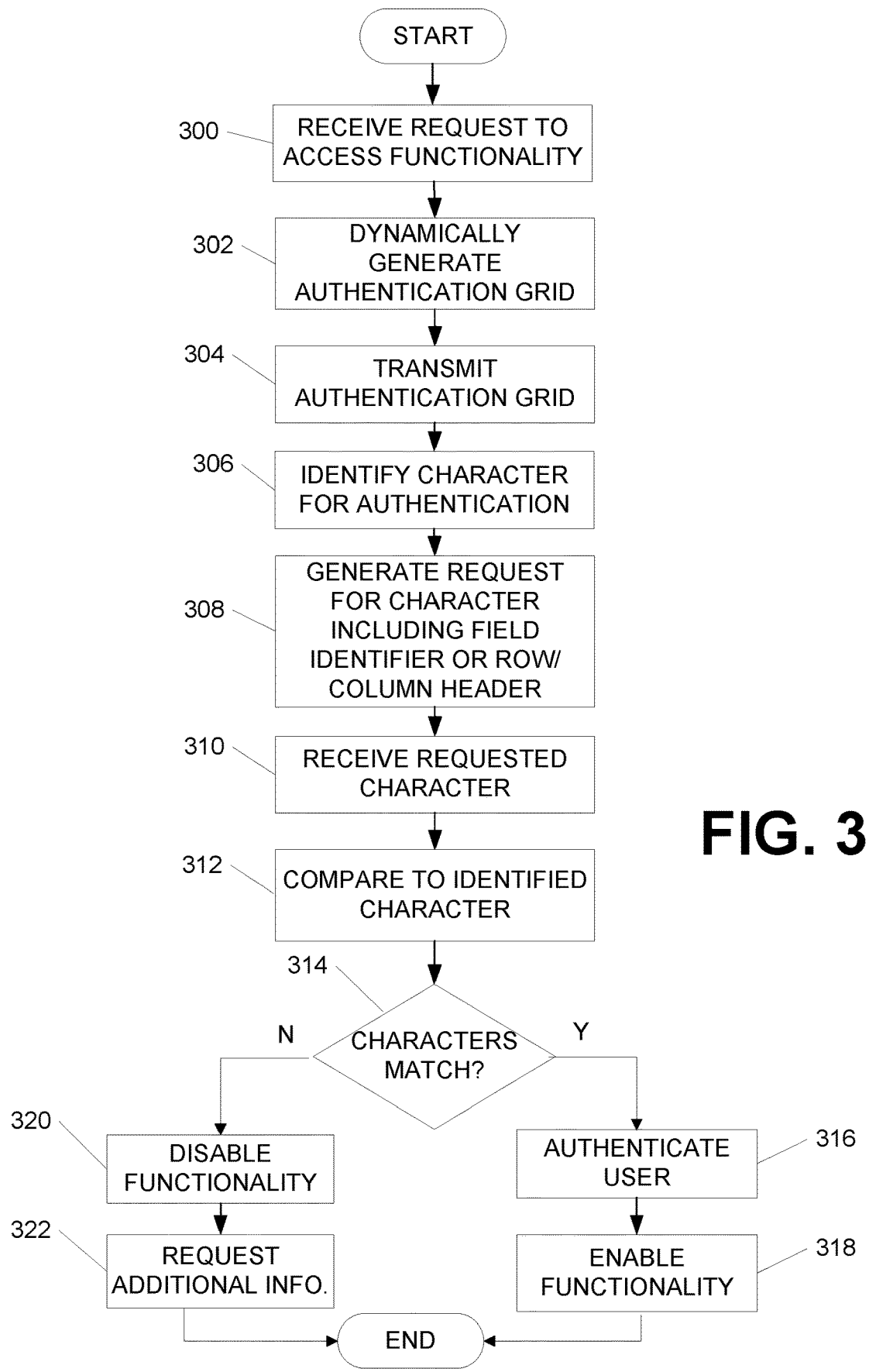
FIG. 3 depicts an illustrative method for implementing and using a system to perform dynamic authentication functions, according to one or more aspects described herein.

FIG. 3 is a flow chart illustrating one example method of implementing dynamic authentication functions according to one or more aspects described herein. The processes illustrated in FIG. 3 are merely some example processes and functions. The steps shown may be performed in a different order, more steps may be added, or one or more steps may be omitted without departing from the invention.

In step 300, a request to access functionality may be received. As discussed above, the request may be received from a remote user computing device 170, 175, such as a mobile device of a user, laptop, tablet, or other user computing device. In some examples, the request may be received by an event processing channel computing device 120, 130. For instance, the request may be received via a call center associate computing device, an automated service kiosk, an ATM, or the like.

In some examples, the request to access functionality may including providing a first level of authentication information. For instance, a user may login to an online system using a username and password, personal identification number (PIN) or the like. In some arrangements, a user may be automatically authenticated by placing the request to access functionality from a particular device (e.g., by opening a mobile application executing on a mobile device of the user, the user may be automated authenticated at a first level of authentication because the device may be recognized).

At step 302, an authentication grid may be dynamically generated. For instance, in response to receiving the request for functionality, an authentication grid may be generated. In some examples, the authentication grid may provide a first or only level of authentication. In other examples in which a first level of authentication has been established, the authentication grid and associated functions may provide a second level of authentication.

As discussed above, the authentication grid may include fields having a row header and column header labeling each field and/or a field identifier identifying each field. Row and column headers, as well as field identifiers, may include a number, letter, string of numbers or letters, or the like. Each field may contain one or more characters that may be used to authenticate a user. In some examples, the characters may be randomly generated and randomly placed within the authentication grid.

At step 304, the authentication grid may be transmitted to the remote user computing device 170, 175. The authentication grid may be displayed to the user via the remote user computing device 170, 175.

At step 306, a character for authentication may be pre-generated or identified. For instance, a character for authentication may be selected from the generated authentication grid. In another example, the character for authentication may be pre-generated and included in a field upon generation of the authentication grid.

At step 308, a request for a character may be generated. The request for a character may include an instruction requesting user input including a character appearing in a particular field in the authentication grid. In some examples, the field may be identified by the row header and column header, field identifier, or the like, corresponding to the particular field.

At step 310, the requested character may be received (e.g., from the remote user computing device 170, 175) and, in step 312, may be compared to the identified character. At step 314, a determination may be made as to whether the received character matches the identified character for authentication. If so, the user may be authenticated in step 316 and functionality may be enabled in step 318. For instance, some or all functionality may be enabled and accessible to the user based on the authentication from the authentication grid.

If, in step 314, the received character does not match the identified character, functionality may be disabled in step 320. For instance, one or more functions that were enabled for the user may be disabled until further authentication is provided. In step 322, additional authenticating information may be requested from the user.

Figure 4:
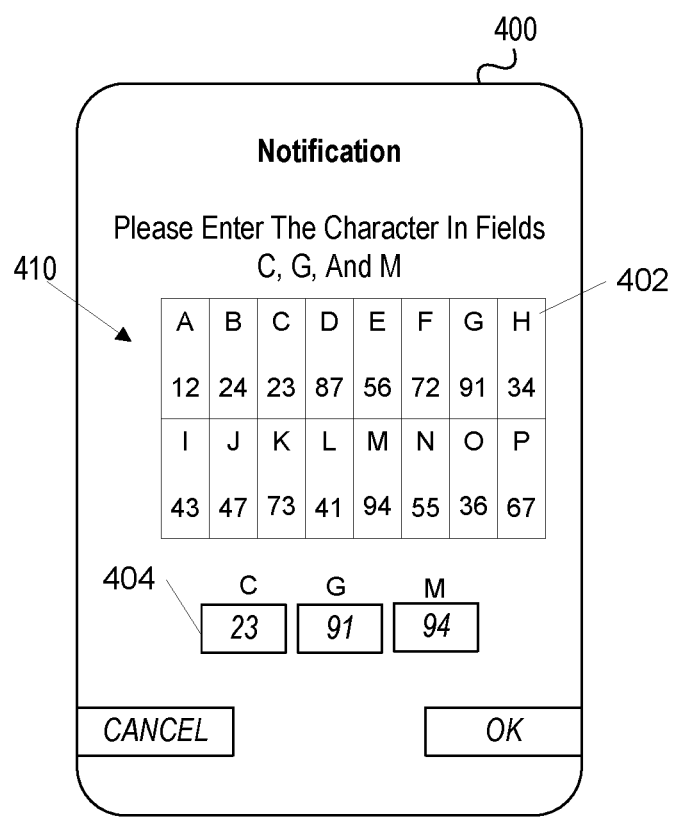
FIG. 4 illustrates an example user interface that may be generated and used to dynamically authenticate a user, according to one or more aspects described herein.

FIG. 4 illustrates one example user interface for use with dynamic authentication functions. The interface 400 includes an instruction to provide user input including a character identified by a field identifier. In the user interface 400, the instruction includes a request to provide the character appearing in the fields associated with identifiers C, G, and M.

The authentication grid 410 may be displayed in interface 400 and may include a series of fields 402 including an identifier arranged above a character or other data that may be used for authentication. The user may identify the field or fields provided in the instructions and may input the character or characters appearing in that fields in fields 404. In the example of interface 400, the user has input characters 23 into the field associated with field C, 91 into the field associated with field G, and 94 into the field associated with field M. The user may then select "OK" option to transmit the user input to the dynamic authentication computing platform for comparison and authentication, or may select "CANCEL" option to return to a previous interface or exit the system.

Figure 5:
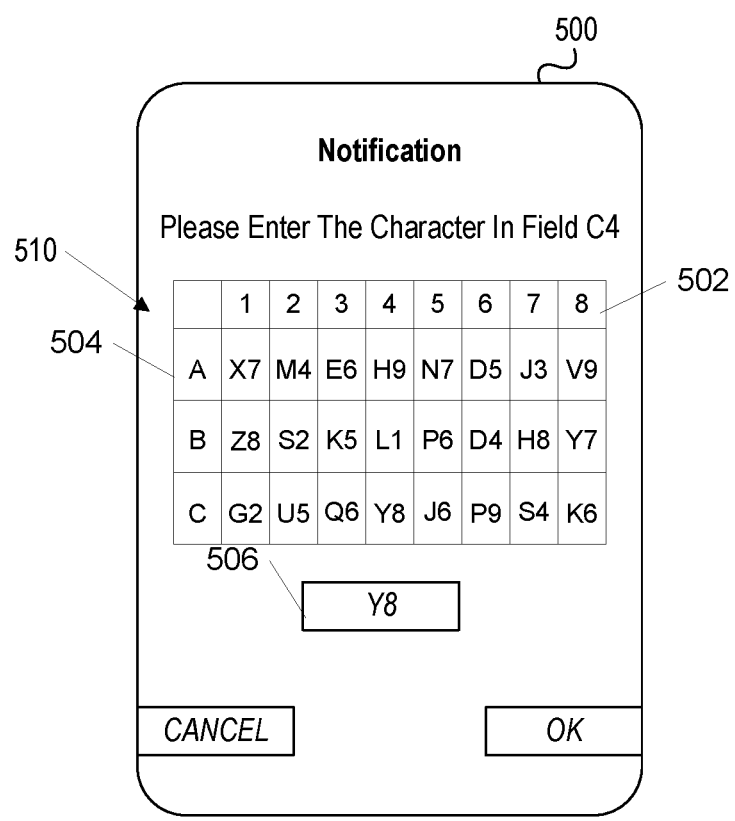
FIG. 5 illustrates another example user interface that may be generated and used to dynamically authenticate a user, according to one or more aspects described herein.

FIG. 5 illustrates another example user interface for use with dynamic authentication functions. The interface 500 includes an instruction to provide user input including a character identified by row header and column header. In the user interface 500, the instruction includes a request to provide the character appearing in the field associated with row C, column 4.

The authentication grid 510 may be displayed in interface 500 and may include a series of fields formed from a plurality of rows 504 and columns 502. The user may identify the field provided in the instructions and may input the character appearing in that field in field 506. In the example of interface 500, the user has input character Y8, as shown in field C4. The user may then select "OK" option to transmit the user input to the dynamic authentication computing platform for comparison and authentication, or may select "CANCEL" option to return to a previous interface or exit the system.

As discussed herein, the arrangements described provide for use of dynamic authentication to authenticate a user. In some examples, the dynamic authentication aspects described herein may be used as a first or only level of authentication. In other examples, the dynamic authentication aspects discussed herein may be used as a second or other additional level of authentication.

For instance, in some examples, certain types of functionality or requests meeting certain thresholds may require an additional layer or level of authentication. For example, high dollar value events or transactions, certain types of events such as opening or closing an account, and the like, may require additional authentication. Accordingly, the dynamic authentication aspects described herein may be used to provide this additional factor or layer of authentication.

In some examples, an authentication grid may be generated and displayed to a user, but no request for data from the authentication grid may be made because the type of functionality being requested might not meet criteria for using the authentication grid.

In some examples, the authentication grid may be generated and/or loaded during startup of a device, application, or the like. In other arrangements, the authentication grid may be loaded when an online application is opened, when a user is authenticated to a system, or the like. In still other arrangements, the authentication grid may be generated and/or loaded upon a user request (e.g., a call center associate may request use of an authentication grid to authenticate a caller). In some examples, the grid may be transmitted to a user via pre-registered information, such as email or SMS to an address or number provided by the user during a registration process. Accordingly, in some examples, the generated authentication grid may be transmitted as a push notification to a user.

In some arrangements, the authentication grid generated may be unique to each user, each application, or the like. As discussed herein, the authentication grid may be available for a single use, for multiple uses within a user session, for multiple user sessions, for a predetermined time period, or the like. Upon occurrence of a triggering event (e.g., single use, end of a user session, expiration of time period, or the like) the authentication grid may be deleted. In some examples, deletion of the authentication grid may cause a second, different authentication grid to be generated and provided to the user (e.g., the authentication grid may automatically regenerate including different characters or data in the fields). For instance, upon a user inputting the requested characters and clicking "ok" or "submit," the authentication grid may be automatically deleted and/or may automatically regenerate with new data) In some examples, a user may request regeneration of an authentication grid. Accordingly, the authentication grids may rotate to aid in preventing unauthorized use of the authentication grid.

Although several aspects discussed herein are discussed in the context of an online or mobile application executing on a device, aspects described herein may be used with other channels of event processing, such as ATMs, automated service kiosks, call centers, and the like. For instance, upon initiating an event at an ATM, an authentication grid may be generated and transmitted to a mobile device pre-registered with the system. The mobile device may display the authentication grid to the user and the ATM may request user input including characters from particular fields in the authentication grid. The user may input the requested characters and the user input may be compared to identified characters to determine whether to authenticate the user. If so, functionality is enabled. If not, the user is prevented from accessing functionality (e.g., some or all available via the ATM).

In another example, call center computing devices may include a widget that may generate an authentication grid. A call center associate may then activate the widget to authenticate users calling in for service.

Figure 6:
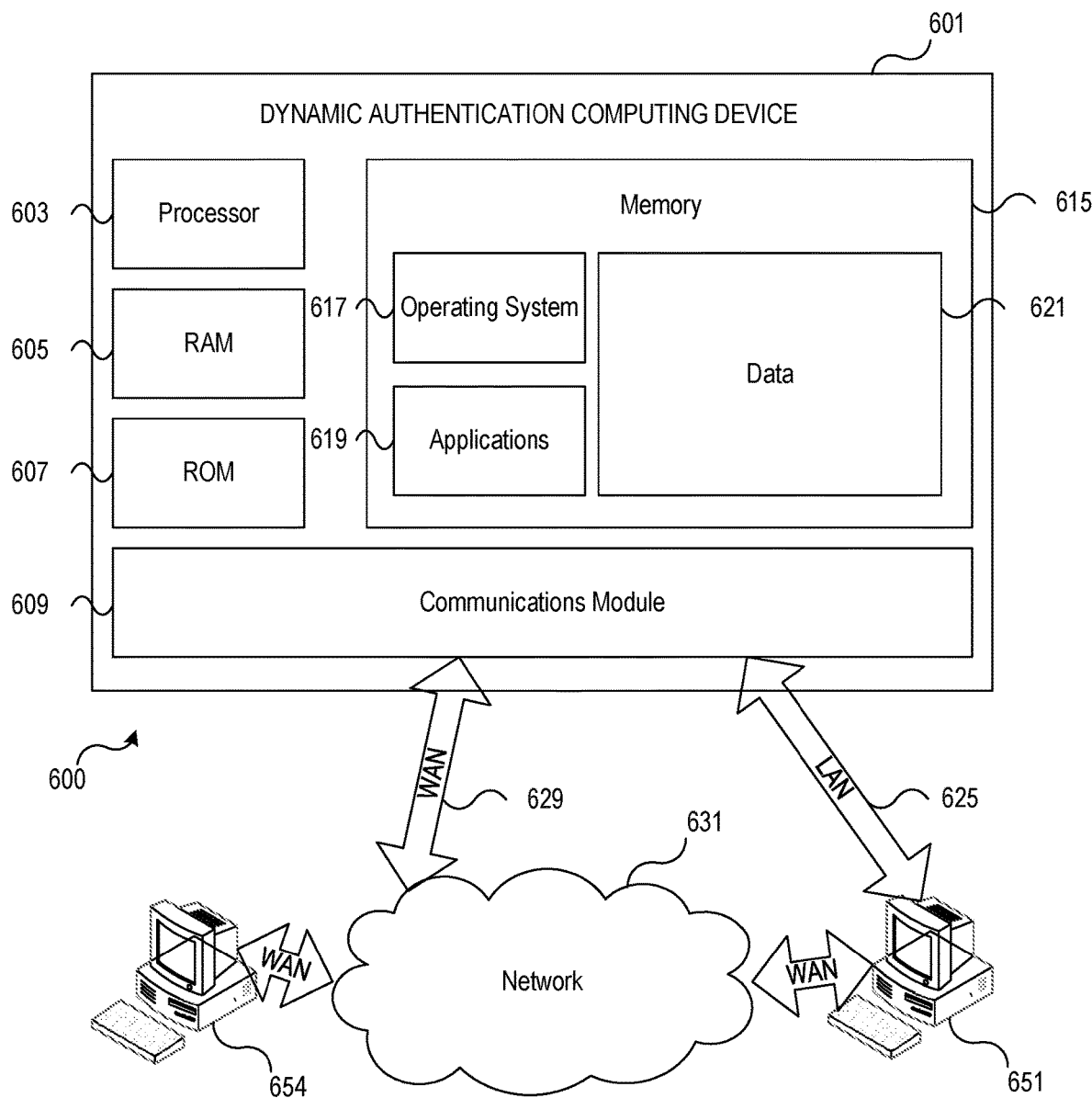
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic authentication computing device 601 having processor 603 for controlling overall operation of dynamic authentication computing device 601 and its associated components, including Random Access Memory (RAM) 605, Read-Only Memory (ROM) 607, communications module 609, and memory 615. Dynamic authentication computing device 601 may include a variety of computer readable media. Computer readable media may be any available media that may be accessed by dynamic authentication computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic authentication computing device 601. Such a processor may execute computer-executable instructions stored on a computer-readable medium.

Software may be stored within memory 615 and/or storage to provide instructions to processor 603 for enabling dynamic authentication computing device 601 to perform various functions as discussed herein. For example, memory 615 may store software used by dynamic authentication computing device 601, such as operating system 617, application programs 619, and associated database 621. Also, some or all of the computer executable instructions for dynamic authentication computing device 601 may be embodied in hardware or firmware. Although not shown, RAM 605 may include one or more applications representing the application data stored in RAM 605 while dynamic authentication computing device 601 is on and corresponding software applications (e.g., software tasks) are running on dynamic authentication computing device 601.

Communications module 609 may include a microphone, keypad, touch screen, and/or stylus through which a user of dynamic authentication computing device 601 may provide input, and may also include one or more of a speaker for providing audio output and a video display device for providing textual, audiovisual and/or graphical output. Computing system environment 600 may also include optical scanners (not shown).

Dynamic authentication computing device 601 may operate in a networked environment supporting connections to one or more remote computing devices, such as computing devices 641 and 651. Computing devices 641 and 651 may be personal computing devices or servers that include any or all of the elements described above relative to dynamic authentication computing device 601.

The network connections depicted in FIG. 6 may include Local Area Network (LAN) 625 and Wide Area Network (WAN) 629, as well as other networks. When used in a LAN networking environment, dynamic authentication computing device 601 may be connected to LAN 625 through a network interface or adapter in communications module 609. When used in a WAN networking environment, dynamic authentication computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
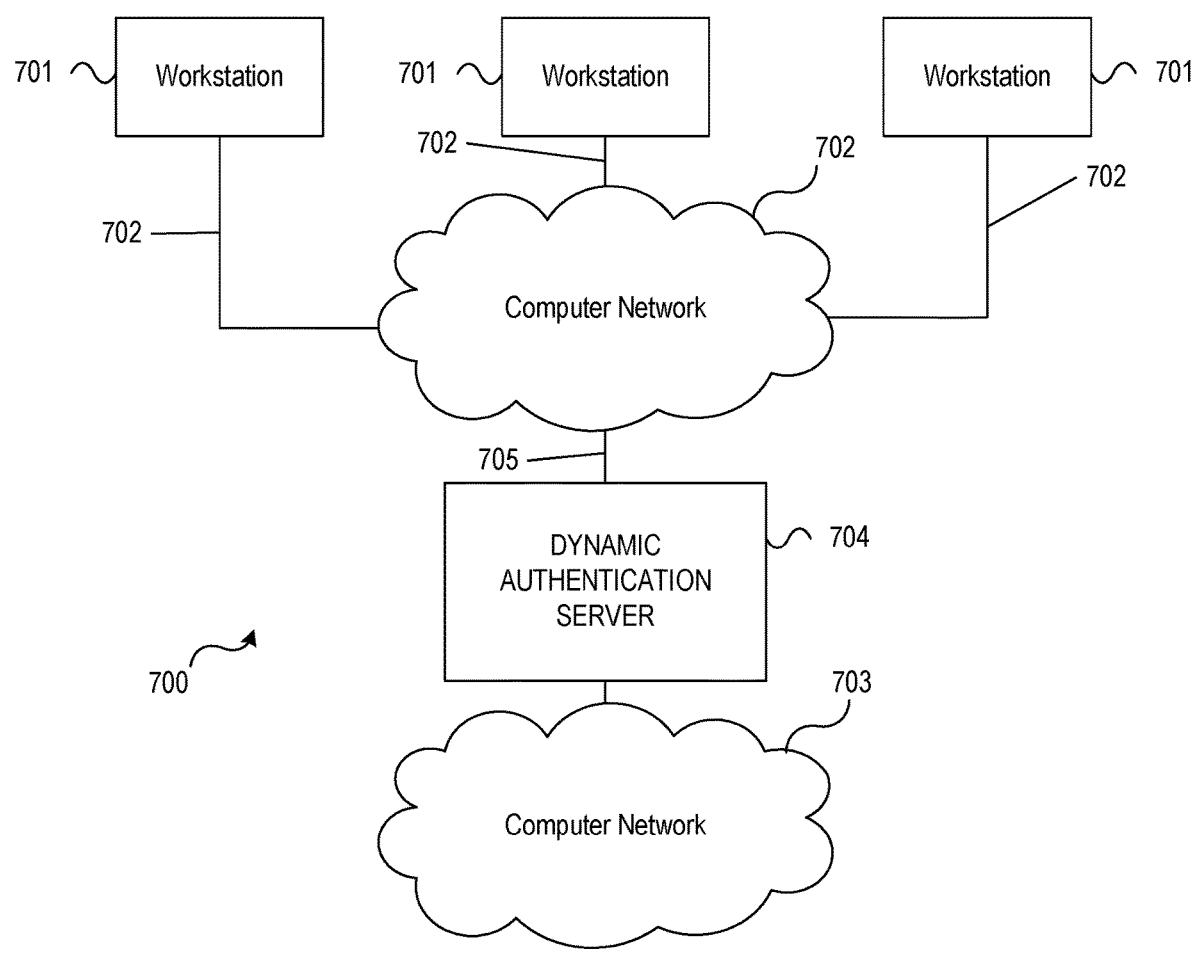
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic authentication server 704. In system 700, dynamic authentication server 704 may be a server, processor, computer, or data processing device, or combination of the same, configured to perform the functions and/or processes described herein. Server 704 may be used to receive requests to provide functionality, dynamically generate an authentication grid, receive user input including a character for authentication, determine whether the character matches a pre-generated character, authenticate a user, enable functionality, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic authentication server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like.

Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic authentication computing platform, comprising:
   at least one processor;
   a communication interface communicatively coupled to the at least one processor; and
   memory storing computer-readable instructions that, when executed by the at least one processor, cause the dynamic authentication computing platform to:
   receive a request to access functionality;
   responsive to receiving the request to access functionality, dynamically generate an authentication grid having a plurality of fields, each field including at least one character for display within a respective field and each field being identifiable by a field identifier associated with each field and for display with each field;
   transmit the dynamically generated authentication grid to a user computing device for display on the user computing device, displaying the authentication grid including displaying the at least one character in each field and the field identifier associated with each field;
   dynamically identify a character for authenticating a user associated with the user computing device;
   generate, based on the dynamically identified character, a request for user input, the requested user input including data from a first field of the authentication grid corresponding to a first field identifier associated with the first field, the first field identifier being identified in the request;
   transmit the generated request for user input to the user computing device;
   receive user input responsive to the transmitted request, the received user input including a character from the authentication grid and identified by the user based on the first field identifier included in the request;
   compare the received user input including the character from the authentication grid to the dynamically identified character;
   determine, based on the comparing, whether the received user input including the character from the authentication grid matches the identified character;
   responsive to determining that the received user input including the character from the authentication grid matches the identified character, authenticate the user and provide access to the functionality;
   responsive to determining that the received user input including the character from the authentication grid does not match the identified character, preventing access to the functionality;
   after at least one of: providing access to the functionality and preventing access to the functionality, generate a command to delete the authentication grid; and
   transmit the command to delete the authentication grid to the user computing device.

2. The dynamic authentication computing platform of claim 1, further including instructions that, when executed, cause the dynamic authentication computing platform to:
   after transmitting the command to delete the authentication grid to the user computing device, receive a second, subsequent request to access functionality; and
   responsive to receiving the second, subsequent request to access functionality, dynamically generate a second authentication grid different from the authentication grid.

3. The dynamic authentication computing platform of claim 2, further including instructions that, when executed, cause the dynamic authentication computing platform to:
   transmit the second authentication grid to the user computing device.

4. The dynamic authentication computing platform of claim 1, further including instructions that, when executed, cause the dynamic authentication computing platform to:
   after expiration of a predetermined time period, generate a command to delete the authentication grid; and
   transmit the command to delete the authentication grid to the user computing device.

5. The dynamic authentication computing platform of claim 1, wherein dynamically identifying a character for authenticating a user associated with the user computing device is performed prior to generating the authentication grid and wherein generating the authentication grid includes generating a field of the authentication grid including the identified character.

6. The dynamic authentication computing platform of claim 1,
wherein dynamically identifying a character for authenticating a user associated with the user computing device is performed after generating the authentication grid and wherein identifying the character for authenticating a user includes selecting a character from a field of the generated authentication grid.

7. The dynamic authentication computing platform of claim 1,
wherein the request to access functionality includes opening an application executing on the user computing device and wherein the authentication grid is dynamically generated upon opening the application.

8. A method, comprising:
at a computing platform comprising at least one processor, memory, and a communication interface:
receiving, by the at least one processor and via the communication interface, a request to access functionality;
responsive to receiving the request to access functionality, dynamically generating, by the at least one processor, an authentication grid having a plurality of fields, each field including at least one character for display within a respective field and each field being identifiable by a field identifier associated with each field and for display with each field;
transmitting, by the at least one processor and via the communication interface, the dynamically generated authentication grid to a user computing device for display on the user computing device, displaying the authentication grid including displaying the at least one character in each field and the field identifier associated with each field;
dynamically identifying, by the at least one processor, a character for authenticating a user associated with the user computing device;
generating, by the at least one processor and based on the dynamically identified character, a request for user input, the requested user input including data from a first field of the authentication grid corresponding to a first field identifier associated with the first field, the first field identifier of the first field being identified in the request;
transmitting, by the at least one processor and via the communication interface, the generated request for user input to the user computing device;
receiving, by the at least one processor and via the communication interface, user input responsive to the transmitted request, the received user input including a character from the authentication grid and identified by the user based on the first field identifier included in the request;
comparing, by the at least one processor, the received user input including the character from the authentication grid to the dynamically identified character;
determining, by the at least one processor and based on the comparing, whether the received user input including the character from the authentication grid matches the identified character;

responsive to determining that the received user input including the character from the authentication grid matches the identified character, authenticating, by the at least one processor, the user and provide access to the functionality;
after providing access to the functionality, generating, by the at least one processor, a command to delete the authentication grid; and
transmitting by the at least one rocessor and via the communication interface, the command to delete the authentication grid to the user computing device.

9. The method of claim 8, further including;
after transmitting the command to delete the authentication grid to the user computing device, receiving, by the at least one processor and via the communication interface, a second, subsequent request to access functionality; and
responsive to receiving the second, subsequent request to access functionality, dynamically generating, by the at least one processor, a second authentication grid different from the authentication grid.

10. The method of claim 9, further including:
transmitting, by the at least one processor and via the communication interface, the second authentication grid to the user computing device.

11. The method of claim 8, further including:
after expiration of a predetermined time period, generating, by the at least one processor, a command to delete the authentication grid; and
transmitting, by the at least one processor, the command to delete the authentication grid to the user computing device.

12. The method of claim 8, wherein dynamically identifying a character for authenticating a user associated with the user computing device is performed prior to generating the authentication grid and wherein generating the authentication grid includes generating a field of the authentication grid including the identified character.

13. The method of claim 8, wherein dynamically identifying a character for authenticating a user associated with the user computing device is performed after generating the authentication grid and wherein identifying the character for authenticating a user includes selecting a character from a field of the generated authentication grid.

14. The method of claim 8, wherein the request to access functionality includes opening an application executing on the user computing device and wherein the authentication grid is dynamically generated upon opening the application.

15. One or more non-transitory computer-readable media storing instructions that, when executed by a computing platform comprising at least one processor, memory, and a communication interface, cause the computing platform to:
receive a request to access functionality;
responsive to receiving the request to access functionality, dynamically generate an authentication grid having a plurality of fields, each field including at least one character for display within a respective field and each field being identifiable by a field identifier associated with each field and for display with each field;
transmit the dynamically generated authentication grid to a user computing device for display on the user computing device, displaying the authentication grid including displaying the at least one character in each field and the field identifier associated with each field;
dynamically identify a character for authenticating a user associated with the user computing device;

generate, based on the dynamically identified character, a request for user input, the requested user input including data from a first field of the authentication grid corresponding to a first field identifier associated with the first field, the first field identifier being identified in the request;

transmit the generated request for user input to the user computing device;

receive user input responsive to the transmitted request, the received user input including a character from the authentication grid and identified by the user based on the first field identifier included in the request;

compare the received user input including the character from the authentication grid to the dynamically identified character;

determine, based on the comparing, whether the received user input including the character from the authentication grid matches the identified character;

responsive to determining that the received user input including the character from the authentication grid matches the identified character, authenticate the user and provide access to the functionality;

responsive to determining that the received user input including the character from the authentication grid does not match the identified character, preventing access to the functionality;

after at least one of: providing access to the functionality and preventing access to the functionality, generate a command to delete the authentication grid; and transmit the command to delete the authentication grid to the user computing device.

16. The one or more non-transitory computer-readable media of claim 15, further including instructions that, when executed, cause the computing platform to:

after transmitting the command to delete the authentication grid to the user computing device, receive a second, subsequent request to access functionality; and responsive to receiving the second, subsequent request to access functionality, dynamically generate a second authentication grid different from the authentication grid.

17. The one or more non-transitory computer-readable media of claim 16, further including instructions that, when executed, cause the computing platform to:

transmit the second authentication grid to the user computing device.

18. The one or more non-transitory computer-readable media of claim 15, further including instructions that, when executed, cause the computing platform to:

after expiration of a predetermined time period, generate a command to delete the authentication grid; and transmit the command to delete the authentication grid to the user computing device.

19. The one or more non-transitory computer-readable media of claim 15, wherein dynamically identifying a character for authenticating a user associated with the user computing device is performed prior to generating the authentication grid and wherein generating the authentication grid includes generating a field of the authentication grid including the identified character.

20. The one or more non-transitory computer-readable media of claim 15, wherein dynamically identifying a character for authenticating a user associated with the user computing device is performed after generating the authentication grid and wherein identifying the character for authenticating a user includes selecting a character from a field of the generated authentication grid.

21. The one or more non-transitory computer-readable media of claim 15, wherein the request to access functionality includes opening an application executing on the user computing device and wherein the authentication grid is dynamically generated upon opening the application.

* * * * *